(12) United States Patent  
Mirisola et al.

(10) Patent No.: US 8,938,748 B1  
(45) Date of Patent: Jan. 20, 2015

(54) DETERMINING CONTENT CONSUMPTION METRICS USING DISPLAY DEVICE POWER STATUS INFORMATION

(75) Inventors: Raimundo Mirisola, London (GB); Tim Volodine, London (GB)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/174,623

(22) Filed: Jun. 30, 2011

Related U.S. Application Data

(60) Provisional application No. 61/486,134, filed on May 13, 2011, provisional application No. 61/489,649, filed on May 24, 2011.

(51) Int. Cl.  
*H04N 7/16* (2011.01)  
*H04H 60/33* (2008.01)  
*H04H 60/45* (2008.01)  
*H04H 60/56* (2008.01)  
*H04H 60/32* (2008.01)

(52) U.S. Cl.  
USPC ......... 725/9; 725/10; 725/11; 725/13; 725/14

(58) Field of Classification Search  
USPC ................................................ 725/9–21, 46  
See application file for complete search history.

(56) References Cited

U.S. PATENT DOCUMENTS

| | | | | |
|---|---|---|---|---|
| 5,532,732 A | * | 7/1996 | Yuen et al. | 725/20 |
| 5,600,364 A | * | 2/1997 | Hendricks et al. | 725/9 |
| 5,872,588 A | * | 2/1999 | Aras et al. | 725/14 |
| 2009/0178071 A1 | | 7/2009 | Whitehead | |
| 2010/0083299 A1 | * | 4/2010 | Nelson et al. | 725/19 |
| 2010/0333125 A1 | | 12/2010 | Eldering et al. | |
| 2011/0072449 A1 | * | 3/2011 | Ivanyi | 725/12 |
| 2012/0260280 A1 | | 10/2012 | Harsh et al. | |
| 2013/0084056 A1 | * | 4/2013 | Harsh et al. | 386/248 |

* cited by examiner

*Primary Examiner* — Mushfikh Alam  
*Assistant Examiner* — Fred Peng  
(74) *Attorney, Agent, or Firm* — Morgan, Lewis & Bockius LLP

(57) ABSTRACT

A method, performed at a computer system having one or more processors and memory storing one or more programs executed by the one or more processors, includes receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs. The method also includes storing the first STB information, and determining a viewership metric for the first plurality of STBs based on the tuning information and the power status information in the first STB information.

19 Claims, 11 Drawing Sheets

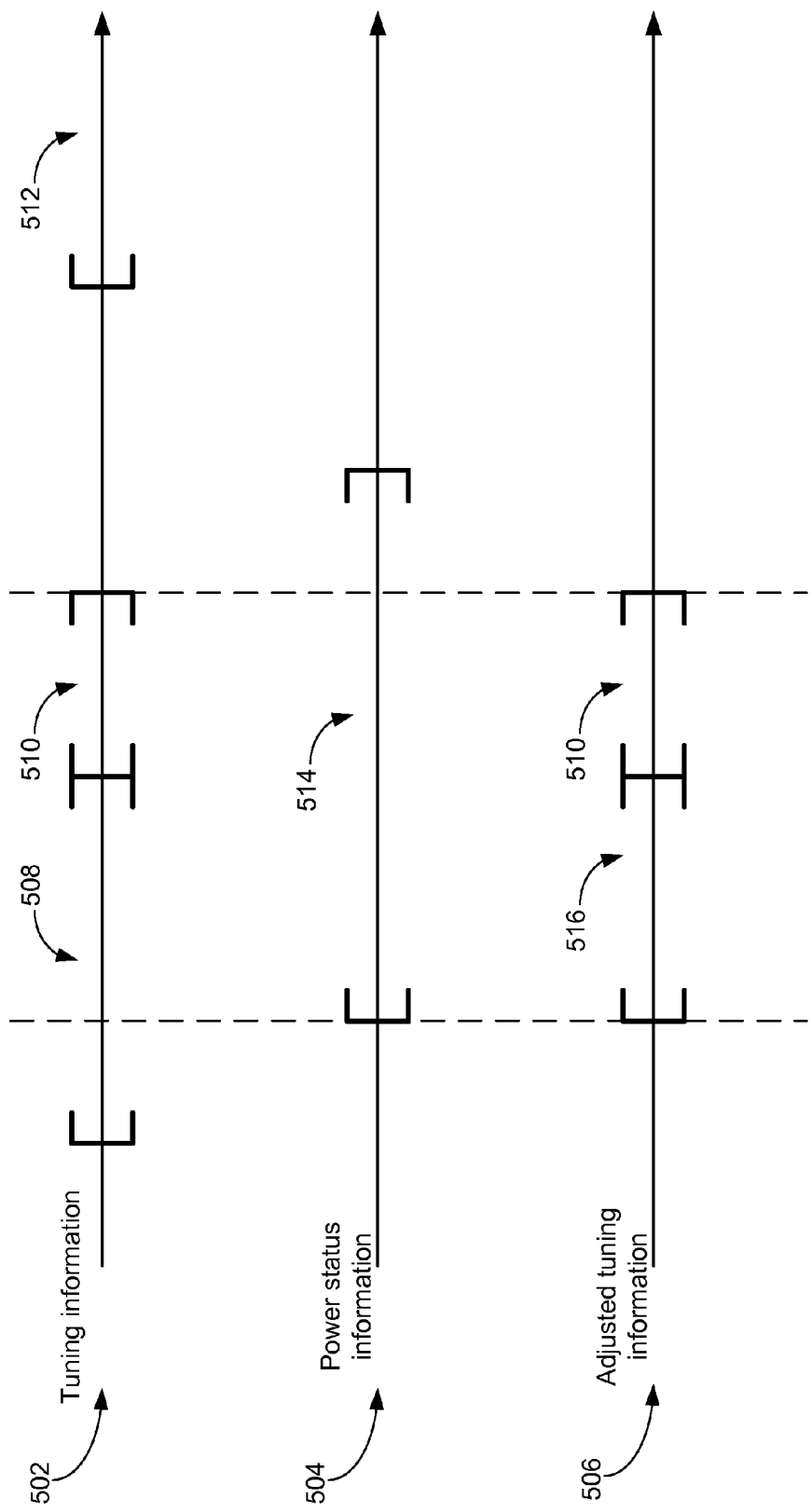

DETERMINING CONTENT CONSUMPTION METRICS USING DISPLAY DEVICE POWER STATUS INFORMATION

RELATED APPLICATIONS

This application claims priority to U.S. Provisional Application Ser. No. 61/486,134, filed May 13, 2011, entitled "Determining Content Consumption Metrics Using Display Device Power Status Information", and to U.S. Provisional Patent Application Ser. No. 61/489,649, filed May 24, 2011, entitled "Determining Set-Top Box Tuning Events", which are incorporated by reference in their entireties.

BACKGROUND

The disclosed implementations relate to content consumption metrics.

Viewership metrics for television programming are important to producers of programming, distributors of programming, and advertisers alike. For example, producers of programming use viewership metrics to gauge the performance of their programming and to make decisions regarding the creative direction for their programming. Distributors of programming use viewership metrics to gauge the performance of programming they distribute and to make decisions regarding programming acquisitions for distribution. Advertisers use such metrics to value advertisement slots associated with programming. Thus, viewership metrics that are accurate are important to the stakeholders involved.

One method of determining viewership metrics is to determine the channels to which a set-top box is tuned at particular time intervals of the day and to aggregate such data from multiple set-top boxes. However, such data is necessarily a rough estimate of viewership, as having a set-top box tuned to a channel at a certain time interval does not necessarily equate to users of that set-top box actually viewing the programming on that channel at that time interval. Thus, when determining viewership metrics, the fact that set-top box activity is not synonymous with actual viewership needs to be taken into account.

SUMMARY

According to some implementations, a method is performed at a computer system having one or more processors and memory storing one or more programs executed by the one or more processors. The method includes receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs. The method also includes storing the first STB information, and determining a viewership metric for the first plurality of STBs based on the tuning information and the power status information in the first STB information.

According to some implementations, a server system includes one or more processing units, and memory storing one or more programs to be executed by the one or more processing units. The one or more programs include instructions for receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs. The one or more programs also include instructions for storing the first STB information, and determining a viewership metric for the first plurality of STBs based on the tuning information and the power status information in the first STB information.

According to some implementations, a non-transitory computer readable storage medium stores one or more programs configured for execution by a computer. The one or more programs include instructions for receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs. The one or more programs also include instructions for storing the first STB information, and determining a viewership metric for the first plurality of STBs based on the tuning information and the power status information in the first STB information.

According to some implementations, a method is performed at a computer system having one or more processors and memory storing one or more programs executed by the one or more processors. The method includes receiving respective first STB information from a first plurality of STBs. The first STB information received from a respective STB in the first plurality of STBs includes tuning information for the respective STB, and power status information for a respective display device coupled to the respective STB in the first plurality of STBs. The method also includes receiving respective second STB information from a second plurality of STBs distinct from the first plurality of STBs. The second STB information received from a respective STB in the second plurality of STBs includes tuning information for the respective STB and does not include power status information for a respective display devices coupled to the respective STB in the second plurality of STBs. The method further includes determining a viewership metric for the second plurality of STBs based on the tuning information in the second STB information, and determining an adjusted viewership metric for the second plurality of STBs based on the tuning information and the power status information in the first STB information.

According to some implementations, a server system includes one or more processing units, and memory storing one or more programs to be executed by the one or more processing units. The one or more programs include instructions for receiving respective first STB information from a first plurality of STBs. The first STB information received from a respective STB in the first plurality of STBs includes tuning information for the respective STB, and power status information for a respective display device coupled to the respective STB in the first plurality of STBs. The one or more programs also include instructions for receiving respective second STB information from a second plurality of STBs distinct from the first plurality of STBs. The second STB information received from a respective STB in the second plurality of STBs includes tuning information for the respective STB and does not include power status information for a respective display devices coupled to the respective STB in the second plurality of STBs. The one or more programs further include instructions for determining a viewership metric for the second plurality of STBs based on the tuning information in the second STB information, and determining an adjusted viewership metric for the second plurality of STBs based on the tuning information and the power status information in the first STB information.

According to some implementations, a non-transitory computer readable storage medium stores one or more programs configured for execution by a computer. The one or more programs include instructions for receiving respective first STB information from a first plurality of STBs. The first STB information received from a respective STB in the first plurality of STBs includes tuning information for the respective STB, and power status information for a respective display device coupled to the respective STB in the first plurality of STBs. The one or more programs also include instructions for receiving respective second STB information from a second plurality of STBs distinct from the first plurality of STBs. The second STB information received from a respective STB in the second plurality of STBs includes tuning information for the respective STB and does not include power status information for a respective display devices coupled to the respective STB in the second plurality of STBs. The one or more programs further include instructions for determining a viewership metric for the second plurality of STBs based on the tuning information in the second STB information, and determining an adjusted viewership metric a for the second plurality of STBs based on the tuning information and the power status information in the first STB information.

BRIEF DESCRIPTION OF THE DRAWINGS

FIG. 5 is a diagram illustrating an example of adjusting tuning information using power status information for a display device, according to some implementations.

DETAILED DESCRIPTION

Consumption (e.g., viewership) metrics may be determined for content (e.g., television programming) distributed to set-top boxes using channel tuning information from the set-top boxes. Simply using channel tuning information may yield imprecise consumption metrics, as channel tuning does not necessarily equate to actual consumption. More precise metrics may be determined by accounting for the power status of the display devices that are coupled to the set-top boxes and are responsible for displaying the content output from the set-top boxes. In some implementations, channel tuning information may be adjusted based on the power status information of display devices, and the adjusted channel tuning information is used to determine the consumption metrics. In some implementations, an adjustment factor is determined based on consumption metrics that account for the display device power status information, and the factor may be used to adjust consumption metrics for set-top boxes where the power status information for the corresponding display device are not available.

Figure 1:
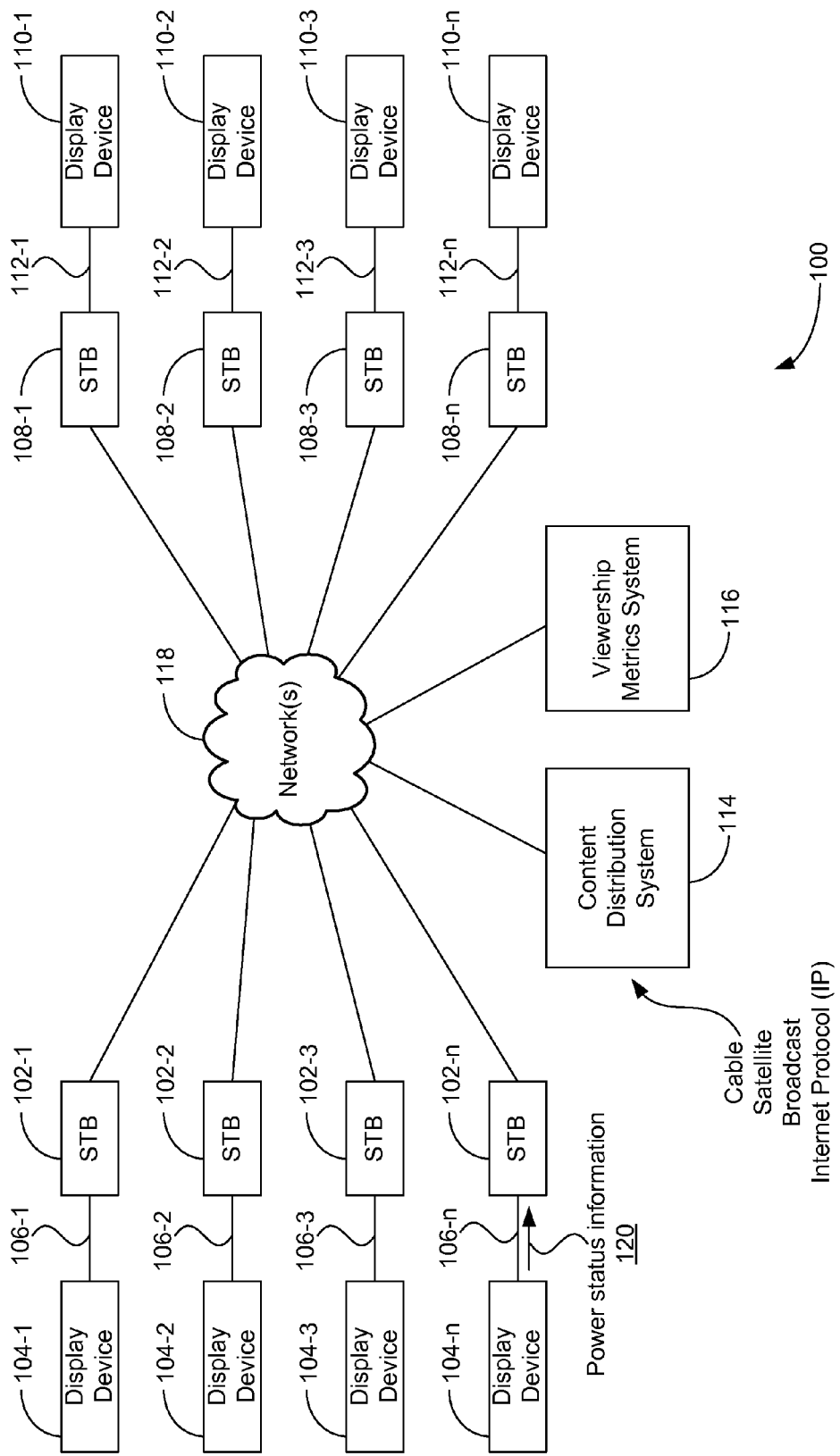
FIG. 1 is a block diagram illustrating a content distribution environment, according to some implementations.

FIG. 1 is a block diagram illustrating a content distribution environment, according to some implementations. The content distribution environment 100 includes multiple set-top boxes (STBs) 102-1 thru 102-n and 108-1 thru 108-n. The STBs 102-1 thru 102-n are coupled to display devices 104-1 thru 104-n by connections 106-1 thru 106-n, respectively. The STBs 108-1 thru 108-n are coupled to display devices 110-1 thru 110-n by connections 112-1 thru 112-n, respectively. STBs 102 and 108 are communicatively coupled to a content distribution system 114 and a viewership metrics system 116 by one or more communications networks 118 (e.g., the Internet). As used in this specification, a set-top box (e.g., STBs 102, 108) is a device that is configured to receive external signals (e.g., cable television signals, satellite television signals, broadcast signals, Internet Protocol television signals) and output content carried in the external signals (e.g., to another device, such as a display device, audio speakers, etc.). In some implementations, a set-top box is a conventional, dedicated set-top box; a hybrid device, such as a digital video recorder (DVR) with set-top box capabilities as described herein; a personal computer with set-top box capabilities, an internet-connected media streaming device with set-top box capabilities, or a game console with set-top box capabilities.

A respective STB 102 receives signals containing content (e.g., television programming, video, audio, etc.) from the content distribution system 114, processes the received signals (e.g., decrypting and/or decoding the signal), and outputs the content to a display device 104 through a connection 106. In some implementations, the display device 104 is a computer monitor or a television. In some implementations, the content distribution system 114 is one or more of a cable, satellite, broadcast, and/or Internet Protocol content distribution system (e.g., cable television system, satellite television system, over-the-air broadcast television system, Internet Protocol television system, etc.).

In some implementations, the signals received from the content distribution system 114 include multiple channels. The STB 102 tunes to a particular channel in the signals to receive the content that may be included in the tuned channel. The STB 102 may tune to any particular channel in the signals in accordance with end user inputs (e.g., an end user changes channels using a remote control) or pre-programmed instructions (e.g., an end user sets the STB 102 in advance to tune to a channel at a specified time in order to digitally record content on that channel).

The connection 106 is a connection or interface that communicatively couples a STB 102 and a display device 104, and enables data transmission between the STB 102 and the display device 104. Data is transmitted between the STB 102 and the display device 104 in accordance with one or more protocols suitable for data transmission over the connection 106. In some implementations, the connection 106 is a wired connection (e.g., a High-Definition Multimedia Interface (HDMI) connection, or another wired digital display connection that provides power status information). In some other implementations, the connection 106 is a wireless connection, through which content may be wirelessly streamed from the STB 102 to the display device 104.

The STBs 102 log tuning information regarding channel tuning activity on the STBs 102. In some implementations, the logged "raw" tuning information for a respective STB 102 includes distinct time intervals, and for each interval, information regarding a channel to which the respective STB 102 is tuned during that interval. For example, the raw tuning information may include a first time interval during which the STB is tuned to channel A, a second time interval during which the STB is tuned to channel B, and a third time interval during which the STB is tuned to channel A. There may be a gap between any two chronologically successive intervals. In some implementations, a gap between chronologically successive intervals is presumed to be an interval when the STB is not tuned to a channel (e.g., because the STB is powered off or on standby; because the STB is outputting an emergency broadcast; because the STB is performing reboot, diagnostics, or software or firmware update operations; etc.).

In some implementations, the tuning information 102 may be logged and/or reported by an STB 102 as events, with each event accompanied by a timestamp. For example, when the STB 102 tunes to a channel, that channel-tuning may be reported as an event, with a particular timestamp. Tuning to a different channel may be reported as another event, with a particular timestamp. The pertinent time intervals may be derived from a time-ordered sequence of the events. For example, the time between successive channel tuning events may be considered to be an interval when the STB 102 is tuned to a particular channel.

The STBs 102 collect power status information 120 for the respective display devices 104 that are coupled to the STBs 102. For example, STB 102-1 collects power status information 120 for display device 104-1 that is coupled to STB 102-1; STB 102-2 collects power status information 120 for display device 104-2 that is coupled to STB 102-2; and so on. In some implementations, the STB 102 is enabled to collect power status information 120 for the display device 104 by the type of the connection 106 coupling the STB 102 to the display device 104 and the associated protocols for communicating through the connection 106. For example, HDMI interfaces and protocols associated with the HDMI interface support power status signals or information transmitted from the display device 104 to a STB 102 coupled to the display device 104 by a HDMI connection. At least, in order to enable collection of display device power status information 120 by a STB 102, the connection 106 allows for two-way data transmission (as opposed to merely one-way transmission from the STB to the display device). In some implementations, the reporting and collection of display device power status information through HDMI interfaces is implemented in accordance with the Consumer Electronics Control specification within the HDMI specification.

In some implementations, the power status information 120 for a respective display device 104 includes information regarding time intervals during which the respective display device 104 is powered on; times outside of these intervals are presumed to be intervals when the display device 104 is powered off. In some other implementations, the power status information 120 for a respective display device 104 includes information regarding time intervals during which the respective display device 104 is powered on and time intervals during which the respective display device is powered off. In some further implementations, the power status information 120 for a respective display device 104 includes information regarding respective time intervals during which the respective display device 104 is powered on, powered off, or on standby.

In some implementations, the power status information 120 is reported by the display device 104 as power status events, each with accompanying timestamps. For example, the time when a display device 104 is powered on, that may be reported as an event with an accompanying timestamp. Similarly, when the display device 104 is powered off or goes into standby, these may be reported as distinct events as well. The pertinent intervals (e.g., intervals when the display device is on, etc.) may be derived from the time-ordered sequence of the events. For example, the time between a power-on event and a successive power-off event may be considered to be an interval when the display device was powered-on.

A respective STB 102 transmits its tuning information and the power status information for the display device 104 coupled to the respective STB 102 to a viewership metrics system 116. The viewership metrics system 116 receives the tuning information and the power status information from the STBs 102, stores the received information, and may process them. Examples of processing of the received information include determining one or more viewership metrics for programming distributed by content distribution system 114 using the information received from the STBs 102, which are described further below. In some implementations, the viewership metrics include any metric that may be derived from a combination of time intervals and channels to which set-top boxes are tuned during those intervals. Examples of viewership metrics include an estimated or projected number of impressions for a program, total viewing time, number of tune-ins and tune-outs, number of visits during a time interval, and so on. The tuning information and/or the power status information may be cross-referenced with a mapping of channels to content providers (e.g., television networks) and/or a mapping of times and channels/content providers to programs to derive viewership metrics for particular content providers and/or particular programs.

In some implementations, viewership metrics are anonymized and no specific user or household is identifiable or trackable from the viewership metrics. In some implementations, a user or STB owner may opt out of having the tuning information and power status information from their STB used in viewership metrics determinations, or the user or STB owner must opt in before the tuning information and power status information from their STB may be used in viewership metrics determinations.

In some implementations, in addition to the tuning information and the power status information, a STB 102 sends additional information to the viewership metrics system 116. The additional information may include power status information for the STB 102, geographic location information of the STB 102, etc. In some implementations, the geographic location information indicates where the STB 102 is located (e.g., city and state, zip/postal code, etc.). For convenience, the tuning information, the power status information (if available), and any additional information sent from a STB 102 to the viewership metrics system 116 may be collectively referred to as STB information.

In some implementations, a STB 102 sends tuning information, power status information, and any additional information to the viewership metrics system 116 periodically. For example, the STB 102 sends the information to the viewership metrics system 116 weekly.

STBs 108, display devices 110, and connections 112 are similar to STBs 102, display devices 104, and connections 106, respectively, and operate analogously, except that the STB information transmitted by STBs 108 does not include power status information for the display devices 110 coupled to the STBs 108; STBs 108 do not collect power status information for the display devices 110 coupled to the STBs 108. In some implementations, the STBs 108 do not collect power status information for display devices 110 because the STBs 108, the display devices 110, and/or the connections 112 are not configured to support collection of the power status information (e.g., the connection 112 is a one-way connection, such as a component video connection or a composite video connection; the display device 110 does not support reporting of power status; the STB 108 and/or the display device 110 lacks the protocol to report power status information; etc.). In some other implementations, the non-collection of the power status information is due to the feature being disabled at the display device 110 (i.e., the display device 110 doesn't report power status information) or at the STB 108 (e.g., the STB 108 ignores any power status information reported by the display device 110).

A content distribution system 114 distributes content (e.g., television programming) to STBs 102, 108 through the network(s) 118. In some implementations, the network(s) 118 include one or more of fiber optic cable networks, coaxial cable networks, satellite networks, copper-wire based networks (e.g., digital subscriber line (DSL), phone line, WAN, LAN, the Internet, etc.), wireless networks (e.g., Wi-Fi), or any mix or combination of the above. In some implementations, the content distribution system 114 is a cable television system, satellite television system, broadcast television system, a system that delivers television programming through fiber optic networks, or an Internet Protocol television (IPTV) system.

In some implementations, STBs 102 and 108 are communicatively coupled to content distribution system 114 through the network(s) 118 in a manner that enables two-way communication between the STBs 102, 108 and the content distribution system 114. In some implementations, the content distribution system 114 includes one or more computing devices (e.g., servers).

A viewership metrics system 116 receives STB information from STBs 102 and 108 and uses the received STB information to determine viewership metrics for content distributed by the content distribution system 114. In some implementations, the viewership metrics system 116 includes one or more computing devices (e.g., servers).

In some implementations, the viewership metrics system 116 is a part of the content distribution system 114. For example, the viewership metrics system 116 is integrated with the content distribution system 114. STB information is transmitted from STBs 102 and 108 to an integrated system that includes the viewership metrics system 116 and the content distribution system 114.

In some other implementations, the content distribution system 114 and the viewership metrics system 116 are distinct systems. For example, the content distribution system 114 may be operated by one entity (e.g., the cable or satellite television operator) and the viewership metrics system 116 is operated by another entity. Alternatively, the content distribution system 114 and the viewership metrics system 116 are distinct systems operated by a common entity. The viewership metrics system 116 communicates with the content distribution system 114 to access whatever information is needed to determine viewership metrics. STB information is transmitted from STBs 102 and 108 to the viewership metrics system 116 either directly (i.e., without the content distribution system 114 as an intermediary) or through the content distribution system 114.

In some implementations, STBs 102 or 108 are coupled to the networks 118 using multiple connections. For example, an STB 102 or 108 may connect to the networks 118 using a satellite connection and an Ethernet connection. The satellite connection may be used to receive content signals from the content distribution system 114, and the Ethernet connection is used to transmit and receive data not directly related to content distribution (e.g., diagnostic information, billing information, STB information, any other signal or data that is not the actual content signal itself) to/from content distribution system 114 and viewership metrics system 116.

Figure 2A:
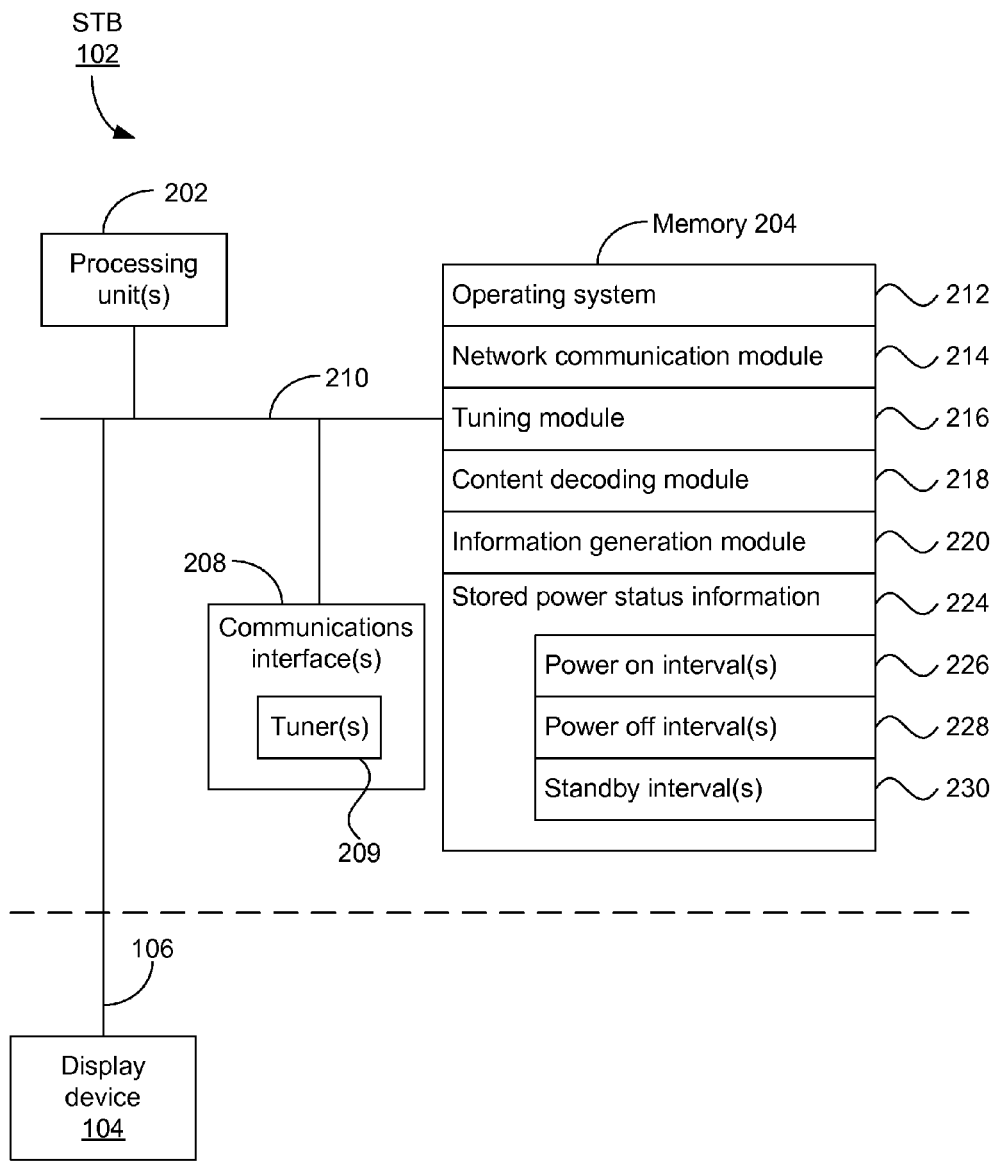
FIGS. 2A-2B are block diagrams illustrating set-top boxes, according to some implementations.
Figure 2B:
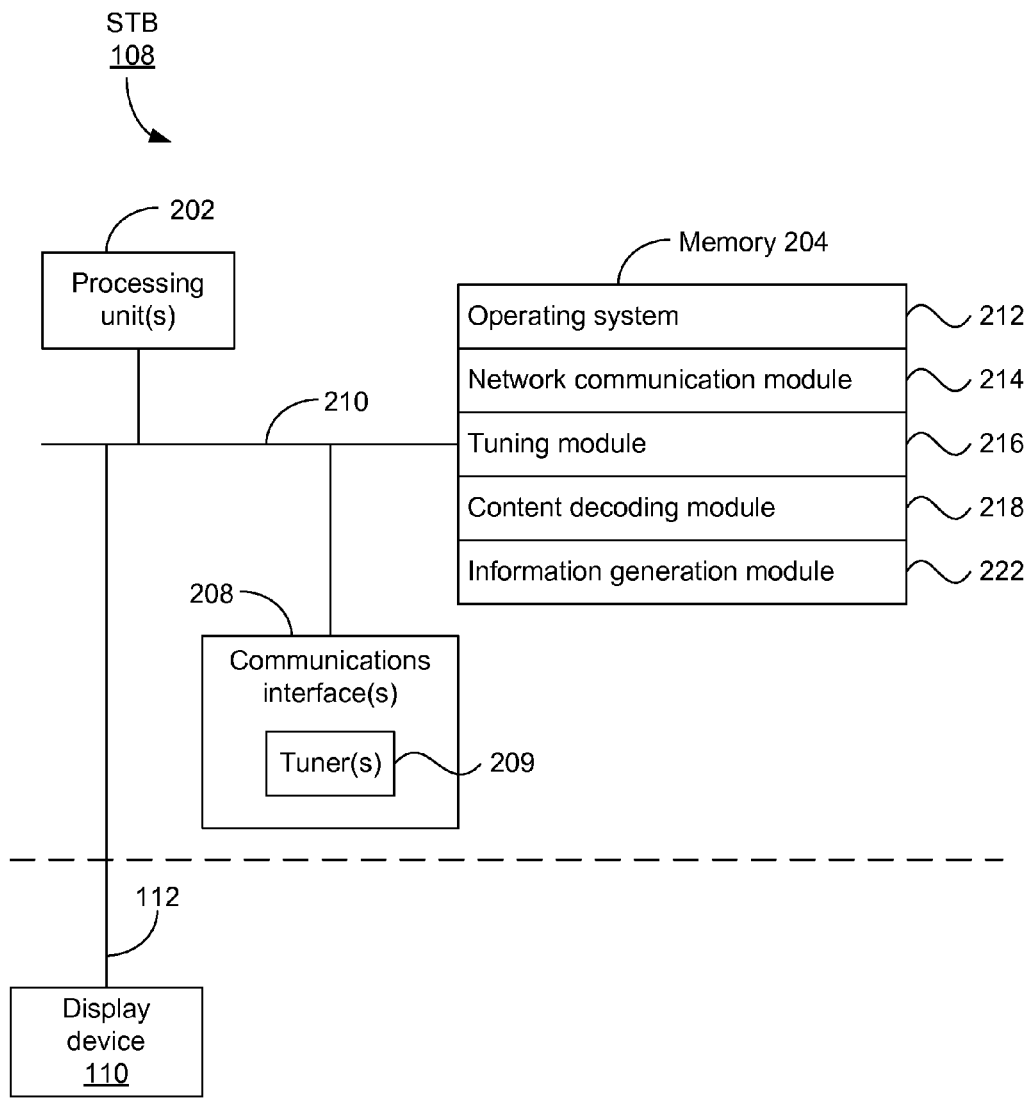

FIGS. 2A-2B are block diagrams illustrating set-top boxes, according to some implementations. In FIG. 2A, a STB 102 typically includes one or more processing units (CPU's) 202, one or more network or other communications interfaces 208, memory 204, and one or more communication buses 210 for interconnecting these components. In some implementations, the communications interfaces 208 includes one or more tuners 209 for tuning to channels in content signals transmitted from content distribution system 114.

In some implementations, the communication bus 210 leads to a connection 106, which connects the STB 102 to a display device 104. In some implementations, the connection 106 is an HDMI connection. In some other implementations, the connection 106 is a wireless connection connecting the display device 104 to a communications interface 208.

Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 may optionally include one or more storage devices remotely located from the CPU(s) 202. Memory 204, or alternately the non-volatile memory device(s) within memory 204, comprises a non-transitory computer readable storage medium. In some implementations, memory 204 or the computer readable storage medium of memory 204 stores the following programs, modules and data structures, or a subset thereof:

- an operating system 212 that includes procedures for handling various basic system services and for performing hardware dependent tasks;
- a network communication module 214 that is used for connecting the STB 102 to other computers or systems (e.g., content distribution system 114, viewership metrics system 116) via the one or more communication network interfaces 208 (wired or wireless) and one or more communication networks, such as the Internet, other wide area networks, local area networks, metropolitan area networks, cable televisions systems, satellite television systems, IPTV systems, and so on;
- a tuning module 216 for tuning to channels in signals received from the content distribution system 114;
- a content decoding module 218 for decoding content signals received from the content distribution system 114 and outputting the content in the decoded signals to the display device 104;
- an information generation module 220 for collecting and generating STB information; and
- stored power status information 224, which stores the power status information 120 received from the coupled display device 104.

The stored power status information 224 includes one or more power on intervals 226 specifying one or more time intervals during which the coupled display device 104 is powered on; and optionally one or more power off intervals 228 specifying one or more time intervals where the coupled display device 104 is powered off, and/or one or more standby intervals 230 specifying one or more time intervals where the coupled display device 104 is on standby.

In FIG. 2B, a STB 108 has similar components to the STB 102. For example, the STB 108 includes one or more processing unit(s) 202, a communication bus 210, one or more network or other communication interfaces 208, one or more tuner(s) 209, and memory 204. The memory includes an operating system 212, a network communication module 214, a tuning module 216, and a content decoding module 218.

The STB 108 also includes components that are similar to, but different from, analogous components in the STB 102. For example, the STB 108 includes a connection 112 connecting the communication bus 210 to a display device 110. Also, the STB 108 includes an information generation module 222.

In some implementations, the connection 112 and display device 110 differs from the connection 106 and the display device 104, respectively, in that the connection 112 and/or the display device 110 does not support reporting of power status information by the display device 110 to the STB 108. For example, the connection 112 may merely be a component or composite video connection and not a HDMI connection.

In some implementations, the information generation module 222 differs from the information generation module 220 in the STB 102 in that the information generation module 222 does not collect power status information 120 from the display device 110. For example, the information generation module 222 may not support the protocols used for power status information reporting.

Figure 3:
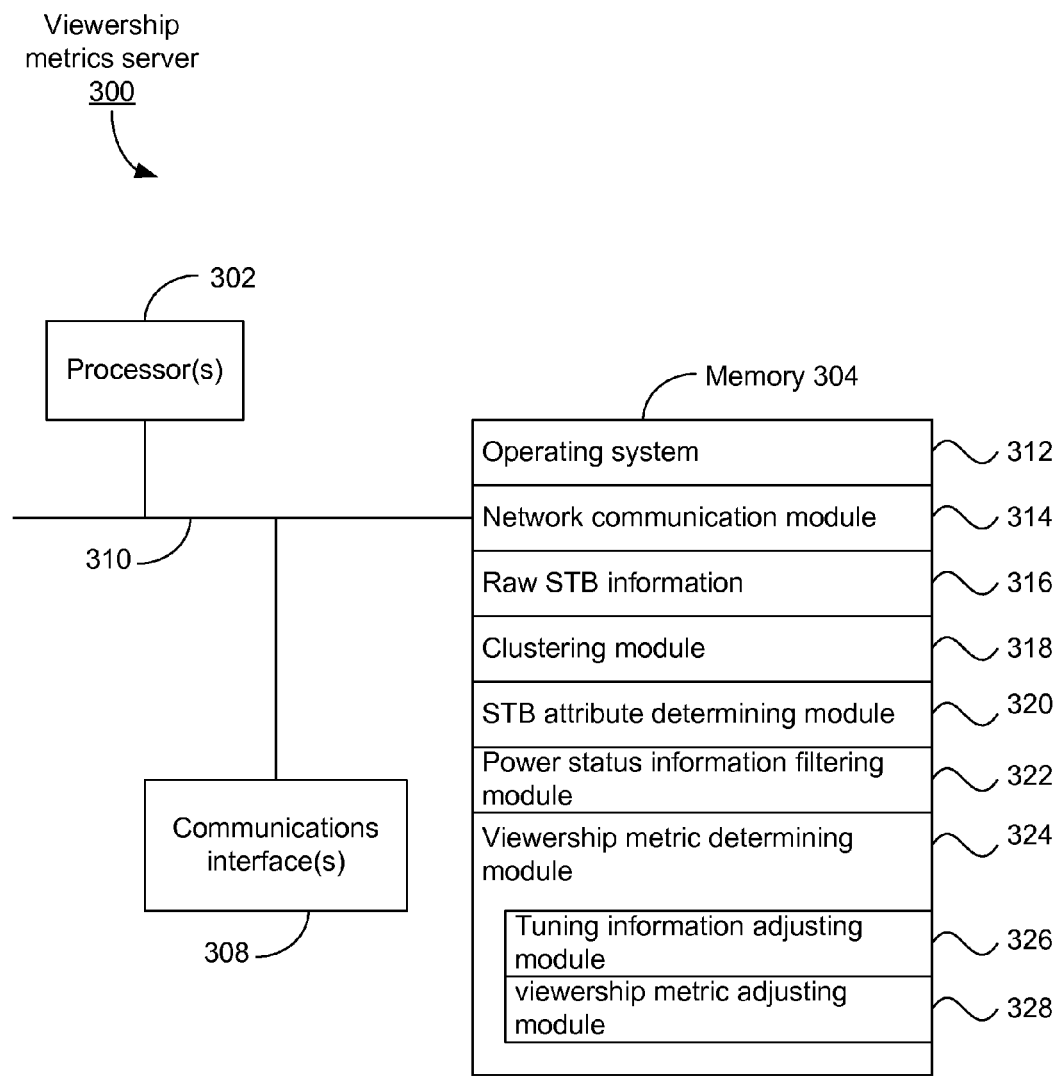
FIG. 3 is a block diagram illustrating a server in a viewership metrics system, according to some implementations.

FIG. 3 is a block diagram illustrating a computing device (e.g., a server) in a viewership metrics system 116, according to some implementations. The server 300 typically includes one or more processing units (CPU's) 302, one or more network or other communications interfaces 308, memory 304, and one or more communication buses 310 for interconnecting these components.

Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(s) 302. Memory 304, or alternately the non-volatile memory device(s) within memory 304, comprises a non-transitory computer readable storage medium. In some implementations, memory 304 or the computer readable storage medium of memory 304 stores the following programs, modules and data structures, or a subset thereof:
- an operating system 312 that includes procedures for handling various basic system services and for performing hardware dependent tasks;
- a network communication module 314 that is used for connecting the server 300 to other computers or systems (e.g., content distribution system 114; STBs 102, 108) via the one or more communication network interfaces 208 (wired or wireless) and one or more communication networks, such as the Internet, other wide area networks, local area networks, metropolitan area networks, cable televisions systems, satellite television systems, IPTV systems, and so on;
- raw STB information 316 received from STBs 102 and 108;
- a clustering module 318 for clustering STB information based on attributes of corresponding set-top boxes;
- a STB attribute determining module 320 for determining one or more attributes (e.g., demographic attributes, location attributes, etc.) associated with set-top boxes;
- a power status information filtering module 322 for filtering power status information; and
- a viewership metric determining module 324 for determining viewership metrics from raw STB information 316.

In some implementations, the viewership metric determining module 324 includes a tuning information adjusting module for adjusting raw tuning information using power status information of display devices, and viewership metric adjusting module 328 for adjusting viewership metrics for STBs that do not collect display device power status information based on viewership metrics for STBs that do collect display device power status information.

FIGS. 2A-2B and 3 are intended more as functional descriptions of the various features which may be present in a set of devices or computer systems than as a structural schematic of the implementations described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement determination of viewership metrics and how features are allocated among them will vary from one implementation to another.

Figure 4A:
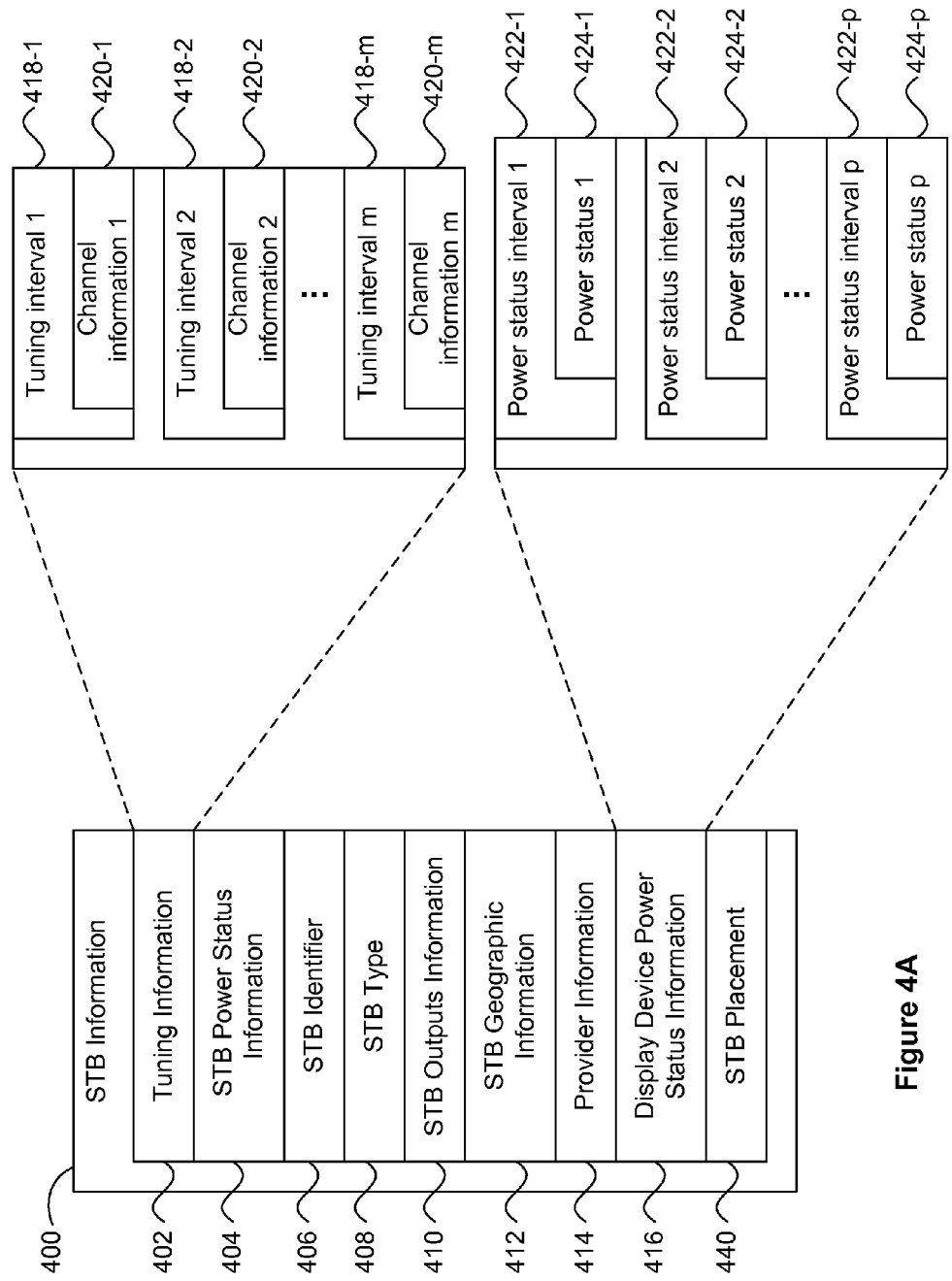
FIGS. 4A-4B are diagrams illustrating data components of STB information sent by set-top boxes, according to some implementations.
Figure 4B:
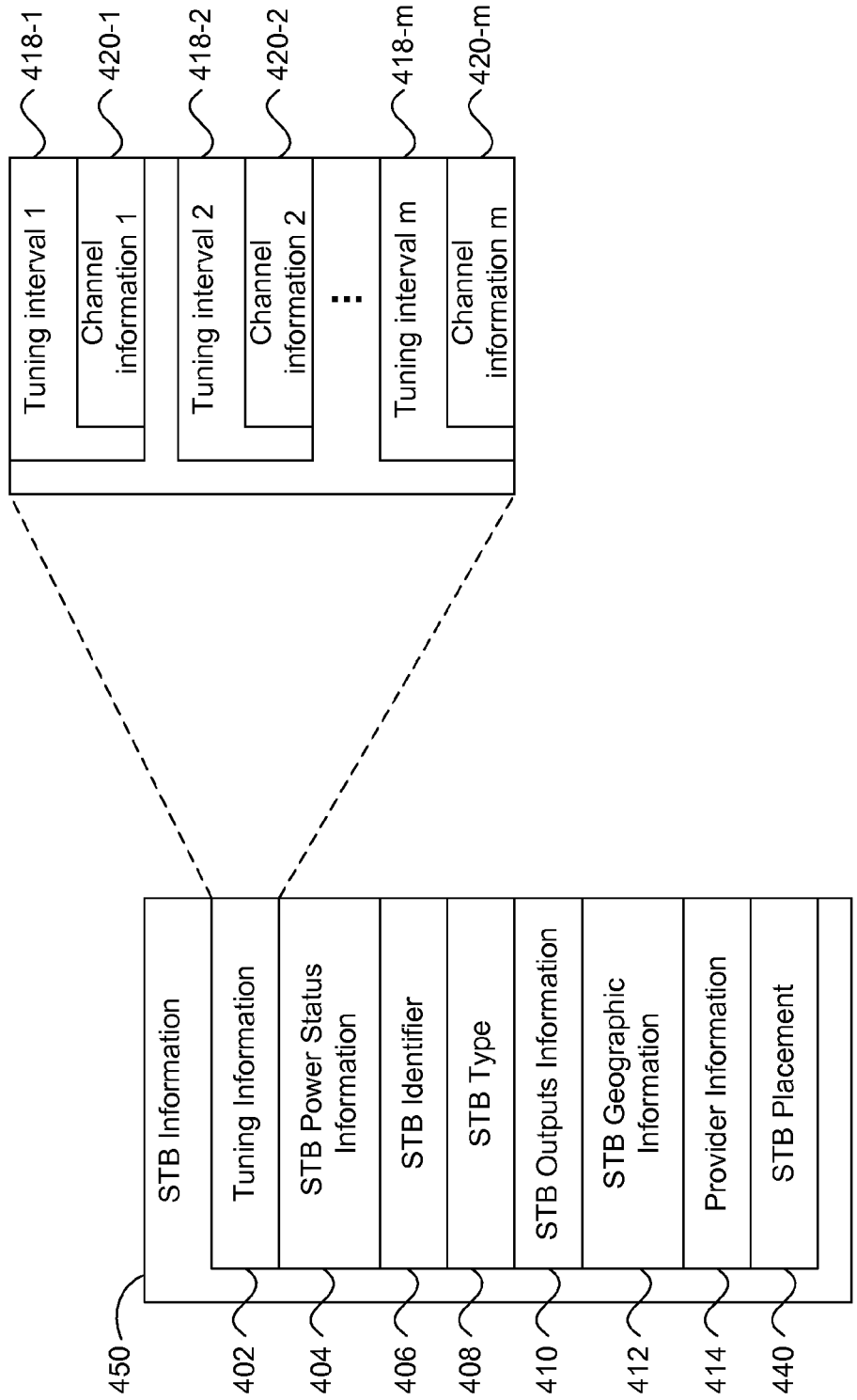

FIGS. 4A-4B are diagrams illustrating data components of STB information sent by set-top boxes, according to some implementations. STB information 400, illustrated in FIG. 4A, is sent from a STB 102 to the viewership metrics system 116. STB information 450, illustrated in FIG. 4B, is sent from a STB 108 to the viewership metrics system 116. Multiple STBs 102 send respective STB information 400 to the viewership metrics system 116, and analogously for STBs 108 with respect to respective STB information 460. In some implementations, a STB 102 or 108 may send STB information 400 and 450, respectively, to the viewership metrics system 116 periodically (e.g., weekly, bi-weekly, monthly).

The STB information 400 sent by a STB 102 includes tuning information 402 and display device power status information 416. The tuning information 402 includes one or more chronologically ordered tuning intervals 418 and for each tuning interval, channel information 420. A tuning interval 418 specifies a time interval during which the sending STB 102 was tuned to a channel indicated in the channel information 420.

The display device power status information includes one or more chronologically ordered power status intervals 422 and for each power status interval 422, a power status 424. A power status interval 422 specifies a time interval during which a display device 104 coupled to the sending STB 102 has the power status (e.g., "powered on") specified in the power status 424.

In some implementations, the display device power status information 416 includes power status intervals 422 in which the power status 424 specifies a "powered on" status but not intervals specifying other statuses; times outside of the intervals 422 are not included in the power status information 416 but are presumed to be intervals where the display device 104 is powered off. In some other implementations, the display device power status information 416 includes power status intervals 422 where the power status 424 is "powered on" as well as intervals 422 with other power statuses 424 (e.g., "powered off," "standby").

In some implementations, the tuning information 402 and the display device power status information 416 include events with accompanying timestamps, rather than intervals. For example, the tuning information 402 may include one or more channel tuning events where the STB tunes to a respective channel and respective timestamps of when those events occurred. Similarly, the display device power status information 416 may include one or more power status events where the display device changes power status to on, off, or standby, and respective timestamps of when those events occurred. The viewership metrics system 116 may derive the pertinent intervals from the sequences of these events along respective timelines (e.g., tuning intervals derived from channel tuning events, power status intervals derived from power status events). For example, an interval [display_on, display off], where "display_on" represents a power-on event, and "display_off" represents a power-off event, indicates an interval where the display device was powered on at the timestamp of the "display_on" event and powered off at the timestamp of the "display_off" event.

STB information 450, as they are sent from STBs 108, are similar in content to STB information 400, with the difference being that STB information 450 does not include display device power status information 416.

In some implementations, the STB information 400 or 450 additionally includes:

STB power status information 404, which identifies the power status (e.g., power on, power off, standby) of the sending STB at specified time intervals;

STB identifier 406, which uniquely identifies the sending STB;

STB type 408, which identifies the model of the sending STB;

STB outputs information 410, which identifies the outputs available on the sending STB and the status of those outputs (e.g., whether the output is connected to a device);

STB geographic information 412, which identifies the geographic location where the sending STB is deployed;

provider information 414, which identifies the content distribution system 114 providing the content signals to the sending STB; and STB placement 440 specifying a location of the sending STB within a household (e.g., living room, family room, bedroom, etc.).

In some implementations, the STB power status information 404, in conjunction with the display device power status information 416, provides additional information regarding use of the STB and the display device. Similar to the display device power status information 416, the STB power status information may be reported as events with respective timestamps, from which time intervals may be derived. The STB power status information 404 may be combined with the display device power status information 416 to derive particular time intervals. For example, the intervals [display_on, display_off] and [display_on, STB_off] may be derived. The interval [display_on, display_off] indicates a time interval when the display was powered on and then powered off sometime later (and the STB power status did not change during the interval). The interval [display_on, STB_off] indicates a time interval when the display was powered on and then the STB was powered off sometime later (while the display remained powered-on). Other intervals based on display device power status events, STB power status events, or combinations of such, may be derived. A timeline of intervals may also be derived; this timeline provides more fine-grained information on usage of the display device and of the STB. For example, intervals where the display device is off but the STB is on may be treated as an interval when the user is not viewing content (and thus whatever channel tuning that occurs then are not reliable indicators of actual viewership). This timeline of intervals may also be used to determine certain metrics, such as an average TV-on time per household or per STB.

In some implementations, these additional pieces of information are used to determine the demographics and other attributes of the sending STB and of the user(s) of the sending STB. It should be appreciated that these additional pieces of information are optional. If and how these additional pieces of information are used in the determination of viewership metrics will vary by implementation. In instances where any of these pieces of information is not used in the determination of viewership metrics, the sending of those pieces of information may be omitted. In some implementations, an STB may be opted out, by the user or STB owner, of sending any of these additional pieces of information to the viewership metrics system 116, e.g., for privacy reasons. In some other implementations, an STB must be opted in in order to send any of these additional pieces of information. In some implementations, similar opt-out or opt-in choices may be with respect to tuning information 402 and/or display device power status information 416, effectively controlling whether, or what, information from the STB is used in the viewership metrics determination.

The viewership metric determining module 324 uses the tuning information 402 in STB information 450 to determine viewership metrics for content with respect to STBs 108. For example, the tuning information 402 from the STBs 108 is aggregated to determine viewership metrics with respect to STBs 108.

The viewership metric determining module 324 uses the tuning information 402 and display device power status information 416 in STB information 400 to determine viewership metrics of content with respect to STBs 102. The display device power status information 416 is used to adjust the tuning information 402 to account for times when the display devices coupled to the STBs 102 are not powered on (and therefore, presumably, nobody is actually watching the content output by the STBs 102). The adjusted tuning information is aggregated to determine viewership metrics in an analogous manner as tuning information 402 from the STBs 108 is used, as described above. The viewership metrics determined using the adjusted tuning information has an advantage of being more accurate than viewership metrics determined using just tuning information, as the adjusted tuning information accounts for times when a STB is tuned to a channel but the output display device is powered off (and thus presumably there is no actual viewership associated with the tuning of the STB to the channel).

FIG. 5 is a diagram illustrating an example of adjusting tuning information using power status information for a display device, according to some implementations. FIG. 5 shows a tuning information timeline 502 for an STB 102. The tuning information timeline 502 includes tuning intervals 508, 510, and 512, which correspond to respective tuning intervals 418 that are included in an instance of STB information 400. FIG. 5 also includes a power status information timeline 504 for a display device 104 coupled to the STB 102. The power status information timeline 504 includes a "powered-on" power status interval 514, which corresponds to a respective power status interval 422, where the corresponding power status 424 is "powered-on," that is included in an instance of STB information 400. An intersection of the tuning information timeline 502 and the power status information timeline 504 yields an adjusted tuning information timeline 506. Tuning interval 508 is reduced to adjusted tuning interval 516, which starts at substantially the same time as the power status interval 514; the portion of the tuning interval 508 that does not overlap with the power status interval 514 is removed. Interval 510 is preserved in the adjusted tuning information timeline 506, as it overlaps completely with power status interval 514. The tuning interval 512 is removed entirely, as none of it overlaps with a power status interval on the power status information timeline representing a "powered-on" status. The adjusted tuning intervals in the adjusted tuning information timeline 506 from multiple STBs may be aggregated to determine viewership metrics for the multiple STBs.

FIG. 5 shows tuning interval 510 ending prior to power status interval 514 ending. The portion of the power status interval 514 that does not overlap tuning interval 510 represents a time interval where the display device is powered on but the STB is not tuned to a channel. Examples of situations where this occurs include the user putting the STB on power-off or standby but does not do the same for the display device; the STB receiving and outputting an emergency broadcast; and the STB engaging in reboot, diagnostics, or update operations.

In some implementations, a timeline that includes time intervals having value pairs of display device power status and STB power status (e.g., the timeline described above with respect to FIGS. 4A-4B), may be used in lieu of the power status information timeline 504. The resulting adjusted tuning information timeline 506 may include intervals where both the display device and the STB are powered on and the STB was tuned to a channel (i.e., intersection of a tuning interval with an interval where the display device power status is powered-on and the STB power status is powered-on.

In some implementations, the viewership metrics determined using the adjusted tuning intervals may be further used to adjust viewership metrics determined using tuning information from STBs that do not send display device power status information (STBs 108). An adjustment or correction factor may be defined as a ratio of a viewership metric determined from the adjusted tuning intervals (e.g., the intervals in adjusted tuning information timeline 506), for a set of STBs that send display device power status information (e.g., STBs 102), to the same viewership metric determined from the raw tuning information (e.g., the intervals in tuning information timeline 502) for the same set of STBs. Viewership metrics determined from tuning information sent from a set of STBs that do not send display device power status information (e.g., STBs 108) may be multiplied by the ratio to determine adjusted viewership metrics for that set of STBs.

In some implementations, at least some of the STBs 102 include digital video recording (DVR) capabilities, and viewership metrics for a piece of content include viewership of DVR recordings of the piece of content (as part of the overall viewership of the piece of content and/or as a distinct metric). Playback intervals of DVR recorded content may be adjusted to account for the display device power status, analogous to the adjustment of tuning intervals described above. In some implementations, intervals during which content is recorded by an STB using the DVR capabilities of the STB are not adjusted as the tuning intervals are adjusted as described above.

In some implementations, the determination of viewership metrics and adjusted viewership metrics are illustrated by the equations below. Given a set H of STBs that send tuning information and display power status information (e.g., STBs 102) and a set S of STBs that send tuning information but not display power status information (e.g., STBs 108), and set A of STBs being the union of sets H and S (e.g., STBs 102 and 108). For an individual set-top box in set A, the unadjusted tuning information interval timeline is U, and the display device power status information timeline is $P_i$. $P_i$ for an STB in set S is empty, and $P_i$ for an STB in set H is non-empty. The display device power status-adjusted (or "capped") tuning information timeline C, for an STB in set H is the interval intersections of every pair of intervals in the set Cartesian product $U_i \times P_i$ for that STB (e.g., adjusted tuning information timeline 506, FIG. 5). For a function M=f(L(X)) that determines a particular viewership metric for any set X of set-top boxes using the tuning information timelines L from the STBs in set X, the unadjusted viewership metric for sets H and S may be expressed respectively as:

$$M(H)=f(U(H)) \qquad \text{(Equation 1);}$$

$$M(S)=f(U(S)) \qquad \text{(Equation 2).}$$

$$M(A)=f(U(A)) \qquad \text{(Equation 3)}$$

The power status-adjusted viewership metric for set H is:

$$M'(H)=f(C(H)) \qquad \text{(Equation 4).}$$

An adjustment or correction factor K may be calculated as:

$$K=M'(H)/M(H)=f(C(H))/f(U(H)) \qquad \text{(Equation 5).}$$

An adjusted viewership metric for set S is:

$$M'(S)=M(S)*K=f(U(S))*K \qquad \text{(Equation 6).}$$

An adjusted viewership metric for set A is:

$$M'(A)=M(A)*K=M(S\cup H)*K \qquad \text{(Equation 7).}$$

For some metrics, M(S ∪ H)=M(S)+M(H), and so for these metrics, Equation 6 may be written as:

$$M'(A)=(M(S)+M(H))*K=(M(S)*K)+(M(H)*K)=M'(S)+M'(H)=(f(U(S))*K)+f(C(H)) \qquad \text{(Equation 8).}$$

The operation of Equations 1-7 may be illustrated with the following example. Suppose that the number of sample unique visits, taking only into account the tuning information, on a particular network during a particular time interval, is 80. Thus, M(A)=80. This means that 80 unique set-top boxes in the sample reported that they were tuned at some point during that time interval to that particular network. Out of those 80 visits, the display device power status information of 50 of these unique set-top boxes is known. In other words, M(H)=50 and M(S)=30.

When the tuning information for these 50 set-top boxes is adjusted to account for the corresponding display device power status information, the number of unique visits goes down, from 50, to 40. In other words, M'(H)=40. The adjustment factor K may be calculated as M'(H)/M(H)=40/50=0.8. The adjusted number of unique visits then becomes M'(A)=M(A)*K=80*0.8=64. The adjusted number of unique visits among the set-top boxes where the display device power status information is unknown is M'(S)=30*0.8=24.

In some implementations, the tuning information may be subject to other capping rules before the display device power status information is taken into account. An example of a capping rule is that tuning intervals may be truncated to fit a predefined maximum duration (e.g., 2 hours, 3 hours). In Equations 1-3, M(H), M(S), and M(A) may be calculated as f(T(H)), f(T(S)), and f(T(A)), respectively, where T(X) are the tuning information timelines T, from set-top boxes in set X, that have been capped according to a capping rule unrelated to display device power status, such as a predefined maximum duration capping rule. Equations 3-7 apply analogously, with T(H), T(S), and T(A) replacing U(H), U(S), and U(A), respectively, in the equations, with the condition that C, for any set-top box in set H is still determined using an uncapped tuning information timeline U.

In some implementations, the display device power status information may be filtered for noisy information and the like. For example, "powered-on" intervals of less than 3 minutes in duration may be filtered out and disregarded as noisy.

The filtered display device power status information is used to determine the viewership metric (e.g., used to adjust the tuning information).

In some implementations, the tuning information intervals may be filtered as well. For example, intervals of longer than 16 hours are filtered out and disregarded as lacking user interaction. Intervals that start at specific hours of the day (e.g., late night at 3 AM) may be filtered out and disregarded as the set-top box rebooting. Gaps of less than 5 minutes between two successive intervals may be filled, as the gap may result from a reboot of the set-top box.

In some implementations, STB information 400, 450 from multiple set-top boxes may be clustered according to attributes associated with the set-top boxes and their users. Examples of such attributes include demographics of the users of the set-top boxes, geographic locations of the set-top boxes, type of the respective STB (e.g., the model of set-top box), number of outputs on the respective STB and which of these outputs are being used to output content, placement of the STB in the household (e.g., living room, bedroom, etc.), and the provider (e.g., cable television system or satellite television system operator) who provided the STB to the end user. Viewership metrics may be determined for set-top boxes corresponding to STB information in a cluster; the set-top boxes within the cluster have one or more same attributes (e.g., demographics, placement, location, etc.). In other words, Equations 1-8 apply analogously; set A is the set-top boxes within the cluster (i.e., have a same attribute), and sets H and S are identified from the set-top boxes within the cluster. Determining viewership metrics within a cluster (i.e., determining viewership metrics for set-top boxes having the same attribute, which can be determined by any combination of the STB information 400 (FIG. 4A) or 450 (FIG. 4B)) may help correct for sample bias in the viewership metrics. Further, within a cluster (i.e., having the same attributes/demographics), an adjusted viewership metric may be determined for set-top boxes for which display device power status information is unknown by using an adjustment factor determined from set-top boxes for which display device power status information is known. Thus, an adjustment factor K determined from set H within a cluster may be applied to adjust a viewership metric for set S within the same cluster.

In some implementations, one or more attributes are self-reported by the set-top boxes themselves, and the viewership metrics system 116 determines these attributes in accordance with the self-reported attributes information. For example, STB 400 or 450 may include an STB type 408, STB outputs information 410, a STB geographic location 412, and provider information 414.

In some implementations, one or more attributes are determined from subscriber information. For example, an STB identifier 406 may be included in STB information 400 or 415. The STB identifier 406 is associated with a customer account in the content distribution system 114, which is typically also operated by the same entity as the provider of the STB. Attributes such as demographics and geographic location may be retrieved from the customer account and received by the viewership metrics system in a manner that does not personally identify any specific user or customer. In some other implementations, attributes such as demographics associated with a STB may be determined by analyzing the channel tuning activity (e.g., which channels tuned and at what times) at the STB and comparing them with previously determined (e.g., determined in-house or by external parties) demographic trends for the channels and content on the channels (e.g., the STB user is more likely to be male if sports channels predominate the channel tuning activity, the STB user is more likely to be Hispanic if Spanish-language channels predominate the channel tuning activity, etc.).

In some implementations, one or more attributes are determined by analysis of the tuning information reported by the set-top boxes. For example, a set-top box whose tuning activity typically takes place in "prime time" may be determined to be located in the living room of a household, and a set-top box whose tuning activity typically takes place in late night may be determined to be located in a bedroom of a household.

In some implementations, an adjustment factor K that is determined for a first cluster may be applied, after normalization, to determine a viewership metric for a second cluster that has set-top boxes associated with a different attribute than the set-top boxes in the first cluster. For example, the adjustment factor K may be normalized according to a ratio comparing the attribute for the first cluster to the attribute for the second cluster. The unadjusted viewership metric for the second cluster is multiplied by the normalized factor K to determine an adjusted viewership metric.

Figure 6A:
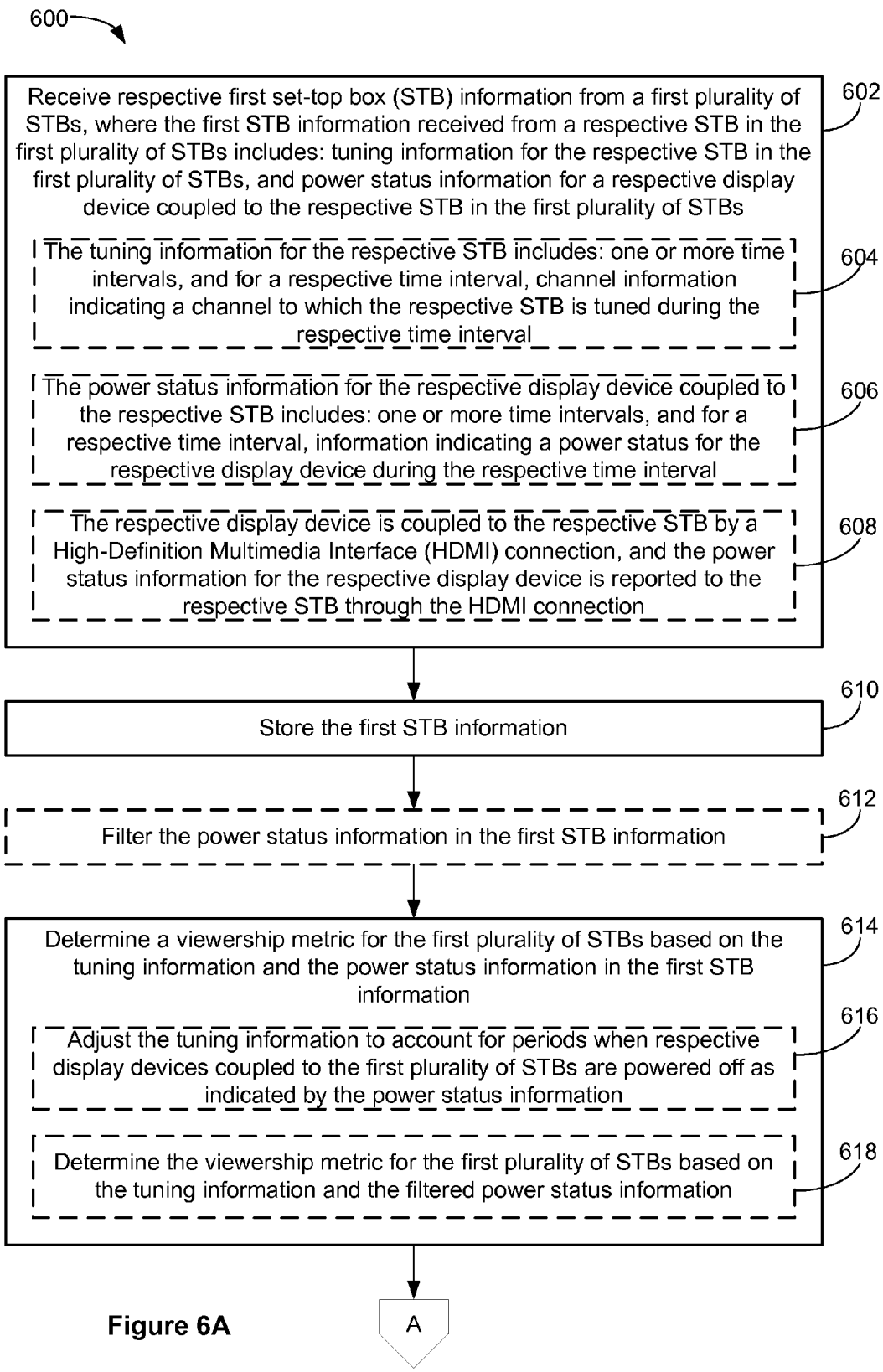
FIGS. 6A-6B are flow diagrams illustrating a process of determining a viewership metric, according to some implementations.
Figure 6B:
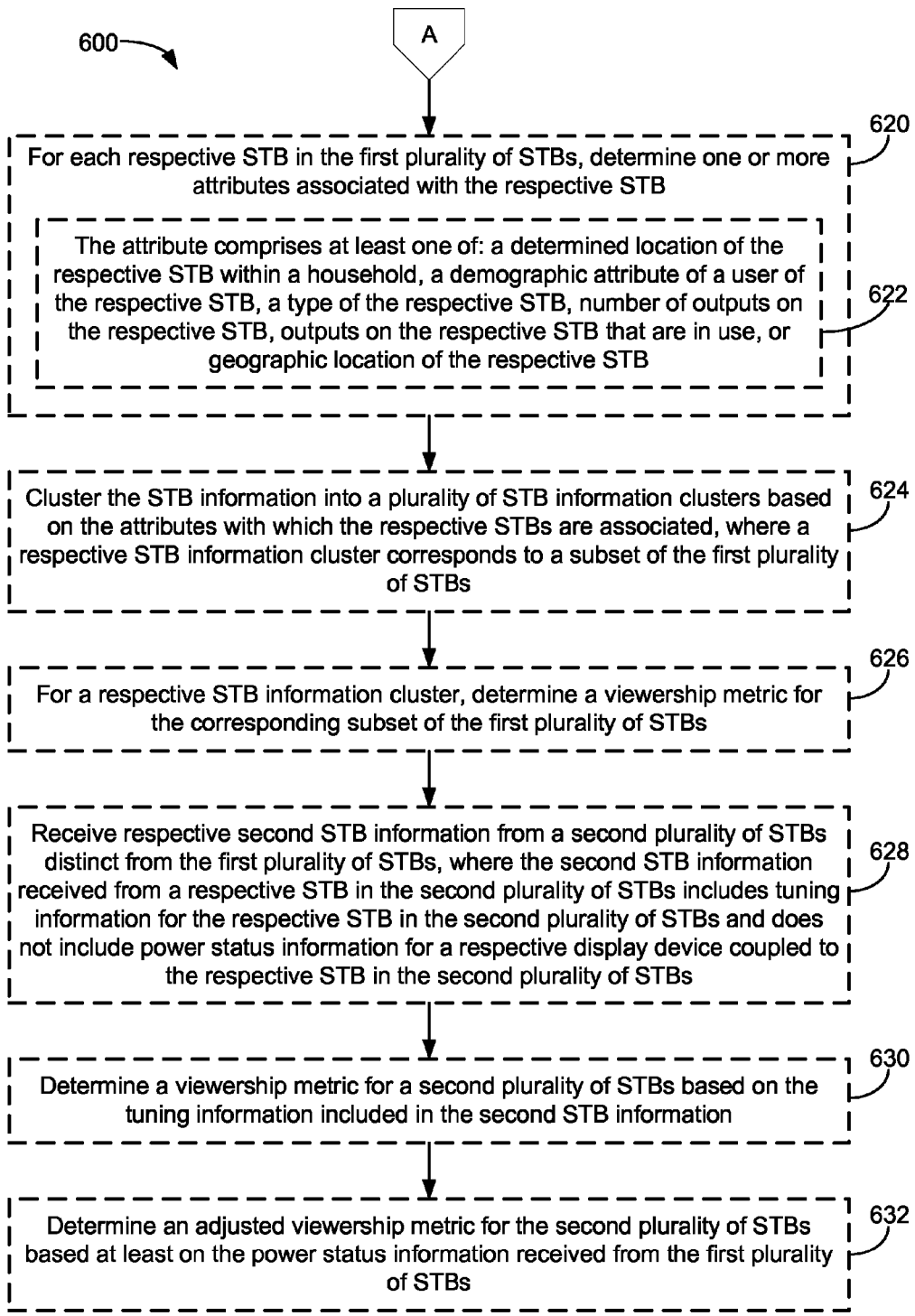

FIGS. 6A-6B are flow diagrams illustrating a process 600 for determining a viewership metric, according to some implementations. Each of the operations shown in FIGS. 6A-6B may correspond to instructions stored in a computer memory or computer readable storage medium. In some implementations, process 600 may be implemented at a viewership metrics system 116 (e.g., at a viewership metrics server 300).

The system receives respective first set-top box (STB) information from a first plurality of STBs (602) The first STB information received from a respective STB in the first plurality of STBs includes tuning information for the respective STB in the first plurality of STBs, and power status information for a respective display device coupled to the respective STB in the first plurality of STBs. For example, the viewership metrics system 116 receives STB information 400 from each of STBs 102. The STB information 400 from a respective STB 102 includes tuning information 402 and display device power status information 416.

The system stores the first STB information (610). For example, the STB information 400 may be stored as raw STB information 316 (FIG. 3) for processing.

The system determines a viewership metric for the first plurality of STBs based on the tuning information and the power status information in the first STB information (614). In some implementations, the determining includes adjusting the tuning information to account for periods when respective display devices coupled to the first plurality of STBs are powered off as indicated by the power status information (616). For example, for an STB, tuning information may be adjusted to account for periods where the display device is not powered on, as in FIG. 5. The adjusted tuning information from multiple STBs is aggregated and used as the argument for a viewership metric function, as in Equation 4 above.

In some implementations, the power status information in the first STB information is filtered (612), and the determining includes determining the viewership metric for the first plurality of STBs based on the tuning information and the filtered power status information (618). The power status information for a display device may be filtered, as described above with respect to FIG. 5 and Equations 1-8, to remove noisy information.

In some implementations, the tuning information for the respective STB includes one or more time intervals, and for a respective time interval, channel information indicating a channel to which the respective STB is tuned during the respective time interval (604). For example, tuning information 402 (FIG. 4A) includes one or more tuning intervals 418 and for each interval 418, channel information 420 indicating the tuned channel during the respective interval.

In some implementations, the power status information for the respective display device coupled to the respective STB includes one or more time intervals, and for a respective time interval, information indicating a power status for the respective display device during the respective time interval (606). For example, display device power status information 416 (FIG. 4A) includes one or more power status intervals 422 and for each interval 422, a power status 424 indicating the power status of the display device during the respective interval.

In some implementations, the respective display device is coupled to the respective STB by a High-Definition Multimedia Interface (HDMI) connection; and the power status information for the respective display device is reported to the respective STB through the HDMI connection (608). For example, connection 106-1 coupling STB 102-1 to display device 104-1 is an HDMI connection.

In some implementations, for each respective STB in the first plurality of STBs, the system determines one or more attributes associated with the respective STB (620). The system clusters the STB information into a plurality of STB information clusters based on the attributes with which the respective STBs are associated, where a respective STB information cluster corresponds to a subset of the first plurality of STBs (624), and for a respective STB information cluster, determines a viewership metric for the corresponding subset of the first plurality of STBs (626). The attribute may be at least one of: a determined location of the respective STB within a household, a demographic attribute of a user of the respective STB, a type of the respective STB, number of outputs on the respective STB, outputs on the respective STB that are in use, or geographic location of the respective STB (622).

As described above, in some implementations, STB information may be clustered according to the attributes associated with the STBs that reported the STB information, and a viewership metric may be determined for the STBs associated with the STB information within a cluster.

In some implementations, the system receives respective second STB information from a second plurality of STBs distinct from the first plurality of STBs (628). The second STB information received from a respective STB in the second plurality of STBs includes tuning information for the respective STB in the second plurality of STBs and does not include power status information for a respective display device coupled to the respective STB in the second plurality of STBs. For example, STB information 450 sent by STBs 108 and received by viewership metrics system 116 include tuning information 402 but not display device power status information 416.

The system determines a viewership metric for a second plurality of STBs based on the tuning information included in the second STB information (630), and determines an adjusted viewership metric for the second plurality of STBs based at least on the power status information received from the first plurality of STBs (632). For example, Equation 2 described above determines a viewership metric for a set of STBs (e.g., STBs 108) whose display device power status is unknown (e.g., because the STBs do not provide them). Equations 5 and 6 described above determine an adjusted viewership metric for the set of STBs (e.g., by determining an adjustment factor using a viewership metric that does take display device power status information into account and applying the adjustment factor to the viewership metric for the set of STBs).

Figure 7A:
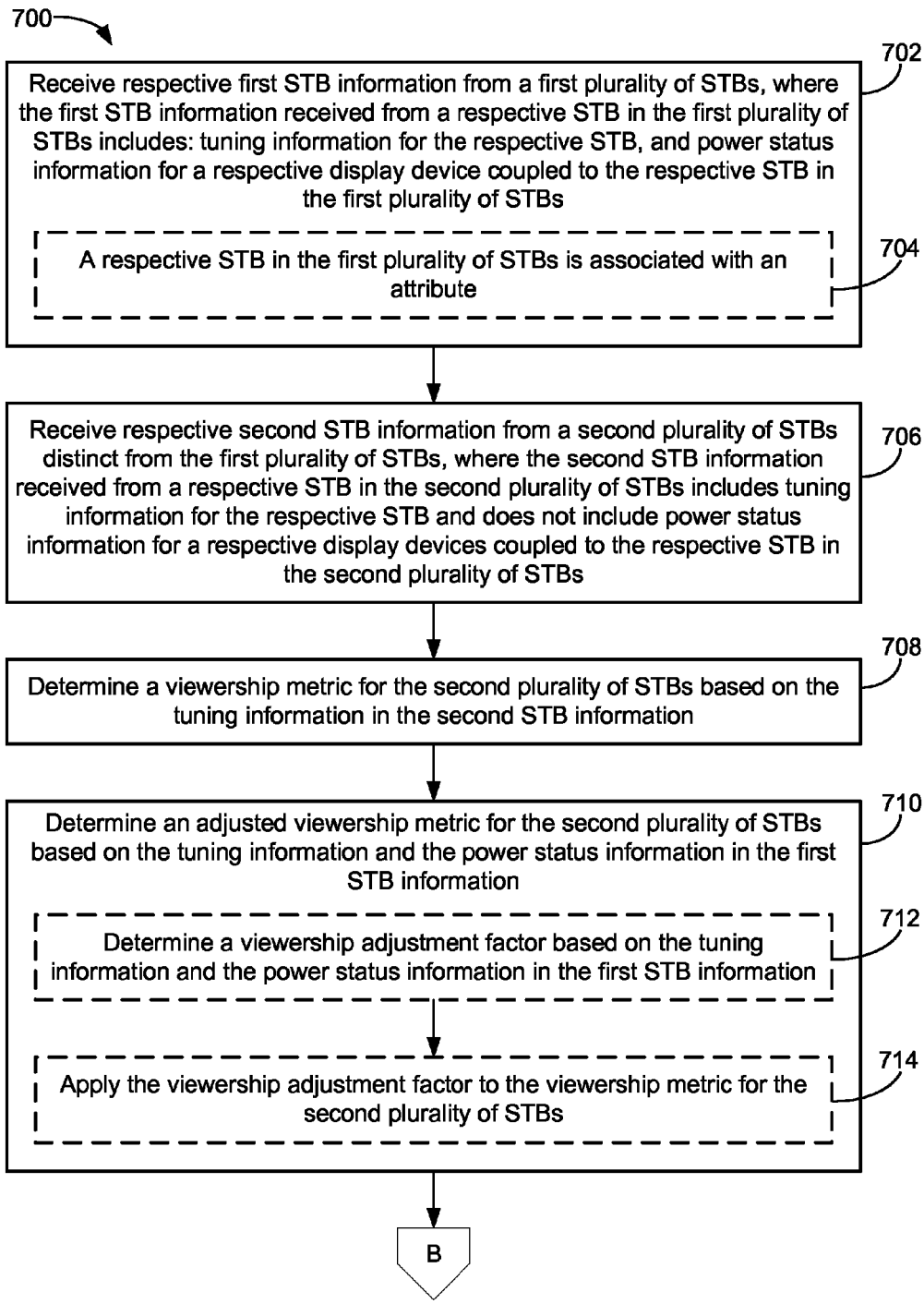
FIGS. 7A-7B are flow diagrams illustrating a process of determining a viewership metric, according to some implementations.
Figure 7B:

FIGS. 7A-7B are flow diagrams illustrating a process 700 for determining a viewership metric, according to some implementations. Each of the operations shown in FIGS. 7A-7B may correspond to instructions stored in a computer memory or computer readable storage medium. In some implementations, process 700 may be implemented at a viewership metrics system 116 (e.g., at a viewership metrics server 300).

The system receives respective first STB information from a first plurality of STBs (702). The first STB information received from a respective STB in the first plurality of STBs includes tuning information for the respective STB, and power status information for a respective display device coupled to the respective STB in the first plurality of STBs. For example, the viewership metrics system 116 receives STB information 400 from each of STBs 102. The STB information 400 from a respective STB 102 includes tuning information 402 and display device power status information 416.

The system receives respective second STB information from a second plurality of STBs distinct from the first plurality of STBs (706). The second STB information received from a respective STB in the second plurality of STBs includes tuning information for the respective STB and does not include power status information for a respective display devices coupled to the respective STB in the second plurality of STBs. For example, the viewership metrics system 116 receives STB information 450 from each of STBs 108. The STB information 450 from a respective STB 108 includes tuning information 402 but not display device power status information 416.

The system determines a viewership metric for the second plurality of STBs based on the tuning information in the second STB information (708), and determines an adjusted viewership metric for the second plurality of STBs based on the tuning information and the power status information in the first STB information (710). For example, Equation 2 described above determines a viewership metric for a set of STBs (e.g., STBs 108) whose display device power status is unknown (e.g., because the STBs do not provide them). Equations 5 and 6 described above determine an adjusted viewership metric for the set of STBs (e.g., by determining an adjustment factor using a viewership metric that does take display device power status information into account and applying the adjustment factor to the viewership metric for the set of STBs).

In some implementations, determining the adjusted viewership metric for the second plurality of STBs based on the tuning information and the power status information in the first STB information includes determining a viewership adjustment factor based on the tuning information and the power status information in the first STB information (712), and applying the viewership adjustment factor to the viewership metric for the second plurality of STBs (714). For example, the adjustment factor K in Equation 5 above is determined based on tuning information and the display device power status information from STBs whose display device power status information is known (e.g., STBs 102). The factor K is applied to the viewership metric M(S) for STBs 108 to determine the adjusted viewership metric M'(S) for STBs whose display device power status information is not known (e.g., STBs 108). In some implementations, the factor K is applied to the viewership metric M(S), provided the factor K can be reliably estimated (i.e., the number of STBs with known display device power status information (STBs 102) is large enough (e.g., at least a predefined threshold) for that particular period of time).

In some implementations, a respective STB in the first plurality of STBs is associated with an attribute (704). The system clusters the first STB information into a plurality of STB information clusters based on the attributes with which the respective STBs are associated, where a respective STB information cluster corresponds to a subset of the first plurality of STBs (716).

In some implementations, the system determines a cluster viewership adjustment factor based on the tuning information and power status information for a respective STB information cluster (720), determines a viewership metric for a subset of the second plurality of STBs that are associated with an attribute in common with the subset of the first plurality of STBs (722), and determines an adjusted viewership metric for the subset of the second plurality of STBs, including applying the cluster viewership adjustment factor to the viewership metric for the subset of the second plurality of STBs (724). For example, as described above, Equations 1-8 apply analogously to the STBs within a cluster. M(S) and M(H) are determined based on the STB information within the cluster, where S and H, are subsets of STBs 108 and 102, respectively, that are in the cluster. The adjustment factor K is determined using the cluster-based M(H), the tuning information and the display device power status information within the cluster. The factor K is applied to M(S) to determine the adjusted metric M'(S).

In some implementations, the attribute includes at least one of: a determined location of the respective STB within a household, a demographic attribute of a user of the respective STB, a type of the respective STB, number of outputs on the respective STB, outputs on the respective STB that are in use, or geographic location of the respective STB (718).

In some implementations, the first plurality of STBs is associated with a first attribute, and a third plurality of STBs is associated with a second attribute distinct from the first attribute (726). The system normalizes the viewership adjustment factor based on the first attribute and the second attribute (728), determines a viewership metric for the third plurality of STBs based on tuning information received from the third plurality of STBs (730), and determines an adjusted viewership metric for the third plurality of STBs, including applying the normalized viewership adjustment factor to the viewership metric for the third plurality of STBs (732). As described above, the adjustment factor K determined for one cluster may be applied to determine a viewership metric for another cluster.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference has been made in detail to implementations, examples of which are illustrated in the accompanying drawings. In the above detailed description, numerous specific details are set forth in order to provide a thorough understanding of the referenced implementations. However, it will be apparent to one of ordinary skill in the art that the referenced implementations may be practiced without these specific details. In other instances, well-known methods, procedures, components, circuits, and networks have not been described in detail so as not to unnecessarily obscure aspects of the implementations.

The foregoing description, for purpose of explanation, has been described with reference to specific implementations. The implementations were chosen and described in order to best explain the principles of the invention and its practical applications, to thereby enable others skilled in the art to best utilize the invention and various implementations with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method, comprising:
   at a server system having one or more processors and memory storing one or more programs executed by the one or more processors:
   receiving respective first set-top box (STB) information from a first plurality of STBs, wherein the first STB information received from a respective STB in the first plurality of STBs includes:
      tuning information for the respective STB in the first plurality of STBs, the tuning information comprising one or more tuning time intervals, and for each respective tuning time interval, channel information indicating a channel to which the respective STB is tuned during the respective tuning time interval, and
      power status information for a respective display device coupled to the respective STB in the first plurality of STBs, the power status information comprising a set of one or more power time intervals, and for each respective power time interval, information indicating a power status for the respective display device during the respective power time interval;

adjusting the set of one or more power time intervals, including one or more of: removing a power time interval, extending a power time interval, or merging two or more power time intervals;

storing the first STB information; and determining a viewership metric for the first plurality of STBs based on the tuning information and the adjusted power status information in the first STB information.

2. The method of claim 1, wherein determining the viewership metric for the first plurality of STBs based on the tuning information and the adjusted power status information in the first STB information comprises:

adjusting the tuning information to account for periods when respective display devices coupled to the first plurality of STBs are powered off as indicated by the adjusted power status information.

3. The method of claim 1, wherein the respective display device is coupled to the respective STB by a High-Definition Multimedia Interface (HDMI) connection; and the power status information for the respective display device is reported to the respective STB through the HDMI connection.

4. The method of claim 1, further comprising:

for each respective STB in the first plurality of STBs, determining one or more attributes associated with the respective STB, wherein the attributes identify physical characteristics of the respective STB, identify use of the respective STB within the household, or identify a content provider for the respective STB;

clustering the STB information into a plurality of STB information clusters based on the attributes with which the respective STBs are associated, wherein a respective STB information cluster corresponds to a subset of the first plurality of STBs; and for a respective STB information cluster, determining a viewership metric for the corresponding subset of the first plurality of STBs.

5. The method of claim 4, wherein the attributes comprise at least one of: a determined location of the respective STB within a household, a type of the respective STB, a number of outputs on the respective STB, or a number of outputs on the respective STB that are in use.

6. The method of claim 1, further comprising:

receiving respective second STB information from a second plurality of STBs distinct from the first plurality of STBs, wherein the second STB information received from a respective STB in the second plurality of STBs includes tuning information for the respective STB in the second plurality of STBs and does not include power status information for a respective display device coupled to the respective STB in the second plurality of STBs;

determining a viewership metric for the second plurality of STBs based on the tuning information included in the second STB information; and determining an adjusted viewership metric for the second plurality of STBs based at least on the adjusted power status information received from the first plurality of STBs.

7. The method of claim 6, wherein a respective STB in the first plurality of STBs is associated with an attribute, the method further comprising:

clustering the first STB information into a plurality of STB information clusters based on the attributes with which the respective STBs are associated, wherein a respective STB information cluster corresponds to a subset of the first plurality of STBs.

8. The method of claim 7, further comprising:

determining a cluster viewership adjustment factor based on the tuning information and power status information for a respective STB information cluster;

determining a viewership metric for a subset of the second plurality of STBs that are associated with an attribute in common with the subset of the first plurality of STBs; and determining an adjusted viewership metric for the subset of the second plurality of STBs, including applying the cluster viewership adjustment factor to the viewership metric for the subset of the second plurality of STBs.

9. The method of claim 7, wherein the attribute comprises at least one of: a determined location of the respective STB within a household, a type of the respective STB, number of outputs on the respective STB, or outputs on the respective STB that are in use.

10. The method of claim 6, wherein the first plurality of STBs is associated with a first attribute, and a third plurality of STBs is associated with a second attribute distinct from the first attribute, the method further comprising:

normalizing the viewership adjustment factor based on the first attribute and the second attribute;

determining a viewership metric for the third plurality of STBs based on tuning information received from the third plurality of STBs; and determining an adjusted viewership metric for the third plurality of STBs, including applying the normalized viewership adjustment factor to the viewership metric for the third plurality of STBs.

11. The method of claim 6, wherein determining the adjusted viewership metric for the second plurality of STBs based on the tuning information and the adjusted power status information in the first STB information comprises:

determining a viewership adjustment factor based on the tuning information and the adjusted power status information in the first STB information; and applying the viewership adjustment factor to the viewership metric for the second plurality of STBs.

12. The method of claim 1, wherein adjusting the set of power time intervals comprises removing time intervals whose duration is less than a first predefined span of time.

13. The method of claim 1, wherein adjusting the set of power time intervals comprises removing time intervals whose duration exceeds a second predefined span of time.

14. The method of claim 1, further comprising filtering the tuning time intervals, wherein determining a viewership metric for the first plurality of STBs is based on the filtered tuning information and the adjusted power status information in the first STB information.

15. The method of claim 14, wherein filtering the tuning time intervals comprises removing time intervals whose duration is less than a third predefined span of time.

16. The method of claim 14, wherein filtering the tuning time intervals comprises removing time intervals whose duration exceeds a fourth predefined span of time.

17. The method of claim 5, wherein the attributes comprise at least two of: a determined location of the respective STB within a household, a type of the respective STB, a number of outputs on the respective STB, or a number of outputs on the respective STB that are in use.

18. A server system, comprising:

one or more processing units;

memory storing one or more programs to be executed by the one or more processing units;

the one or more programs including instructions for:

receiving respective first set-top box (STB) information from a first plurality of STBs, wherein the first STB information received from a respective STB in the first plurality of STBs includes:

tuning information for the respective STB in the first plurality of STBs, the tuning information comprising one or more tuning time intervals, and for each respective tuning time interval, channel information indicating a channel to which the respective STB is tuned during the respective tuning time interval, and power status information for a respective display device coupled to the respective STB in the first plurality of STBs, the power status information comprising a set of one or more power time intervals, and for each respective power time interval, information indicating a power status for the respective display device during the respective power time interval;

adjusting the set of one or more power time intervals, including one or more of: removing a power time interval, extending a power time interval, or merging two or more power time intervals;

storing the first STB information; and determining a viewership metric for the first plurality of STBs based on the tuning information and the power status information in the first STB information.

19. A non-transitory computer readable storage medium storing one or more programs configured for execution by a computer, the one or more programs comprising instructions for:

receiving respective first set-top box (STB) information from a first plurality of STBs, wherein the first STB information received from a respective STB in the first plurality of STBs includes:

tuning information for the respective STB in the first plurality of STBs, the tuning information comprising one or more tuning time intervals, and for each respective tuning time interval, channel information indicating a channel to which the respective STB is tuned during the respective tuning time interval, and power status information for a respective display device coupled to the respective STB in the first plurality of STBs, the power status information comprising a set of one or more power time intervals, and for each respective power time interval, information indicating a power status for the respective display device during the respective power time interval;

adjusting the set of one or more power time intervals, including one or more of: removing a power time interval, extending a power time interval, or merging two or more power time intervals;

storing the first STB information; and determining a viewership metric for the first plurality of STBs based on the tuning information and the power status information in the first STB information.

\* \* \* \* \*